United States Patent
Hatanaka

(10) Patent No.: US 6,889,984 B2
(45) Date of Patent: May 10, 2005

(54) GASKET FOR A DISK APPARATUS, AND COVER, CASE AND DISK APPARATUS HAVING THE SAME

(75) Inventor: Tatsuya Hatanaka, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 35 days.

(21) Appl. No.: 10/377,697

(22) Filed: Mar. 4, 2003

(65) Prior Publication Data

US 2003/0222413 A1 Dec. 4, 2003

(30) Foreign Application Priority Data

May 29, 2002 (JP) ...................................... 2002-155976

(51) Int. Cl.[7] .............................................. G11B 33/14
(52) U.S. Cl. .................... 277/650; 277/945; 360/97.02
(58) Field of Search ................................ 277/650, 945; 360/97.02

(56) References Cited

U.S. PATENT DOCUMENTS

| | | | | |
|---|---|---|---|---|
| 4,251,432 A | * | 2/1981 | Martin ........................ | 523/205 |
| 4,912,171 A | * | 3/1990 | Grootaert et al. ........... | 525/340 |
| 5,326,611 A | * | 7/1994 | Kishita et al. ................ | 428/78 |
| 5,627,251 A | * | 5/1997 | Sato et al. ..................... | 528/15 |
| 5,793,566 A | * | 8/1998 | Scura et al. ............. | 360/97.02 |
| 6,643,093 B2 | * | 11/2003 | Brown et al. ............ | 360/97.02 |
| 6,686,012 B1 | * | 2/2004 | Molnar et al. ........... | 428/36.91 |

FOREIGN PATENT DOCUMENTS

| | | | |
|---|---|---|---|
| JP | 5-132664 | * | 5/1993 |
| JP | 10-237423 | | 9/1998 |
| JP | 2000-344987 | | 12/2000 |
| JP | 2001-279013 | | 10/2001 |

OTHER PUBLICATIONS

Search and Examination Reports, dated Feb. 6, 2004, from the Austrian Patent Office for Patent Application No. 200300792–9.

* cited by examiner

*Primary Examiner*—Alison K. Pickard
(74) *Attorney, Agent, or Firm*—Pillsbury Winthrop LLP

(57) ABSTRACT

A gasket includes a molded product containing a hydrocarbon-based organic elastic material and a fluorine-based resin having a vapor pressure of $1.3 \times 10^{-8}$ Pa to 1.3 kPa at 100° C.

15 Claims, 4 Drawing Sheets

GASKET FOR A DISK APPARATUS, AND COVER, CASE AND DISK APPARATUS HAVING THE SAME

CROSS-REFERENCE TO RELATED APPLICATIONS

This application is based upon and claims the benefit of priority from the prior Japanese Patent Application No. 2002-155976, filed May 29, 2002, the entire contents of which are incorporated herein by reference.

BACKGROUND OF THE INVENTION

1. Field of the Invention

The present invention relates to a disk apparatus for use in, e.g., a magnetic recording system, optical recording system, or magneto-optical recording system, a cover and a case of the disk apparatus, and a gasket for sealing the portion between the cover and case.

2. Description of the Related Art

Generally, a gasket is sandwiched between a case of a disk apparatus and a cover for covering the case. This gasket blocks the flow of air between the case and cover, thereby sealing the portion between them.

This gasket is a molded product formed using an elastic material and having a frame-like shape corresponding to the shape of that frame surface of the case, which faces the cover.

As this gasket material, a fluorine-based resin and hydrocarbon-based elastic materials such as EPDM can be used.

A fluorine-based resin has characteristics unique to the material. That is, surface adsorption contamination by an impurity gas from the environment is little, and the water vapor blocking capability, chemical resistance, and weather resistance are high. Also, since the molding temperature is high, a molded part having only a small amount of an impurity gas component can be formed.

However, molding must be performed at high temperatures, so that a life of a die can become short and the cost of molding can be higher. Also, since the material flowability is low and so is the moldability, a complicated shape or fine shape is difficult to mold. In addition, the specific gravity is large.

On the other hand, the water blocking capability of EPDM is slighter lower than that of the fluorine-based resin. However, the cost of molding of this EPDM is lower, has high moldability, and allows a complicated shape or fine shape to be molded at low molding temperatures. EPDM is also superior to the fluorine-based resin in specific gravity. Accordingly, this EPDM is often used.

Unfortunately, EPDM has the disadvantage that it is susceptible to adsorption contamination by a siloxane-based gas. Therefore, a siloxane-based gas present in the production environment and storage environment is easily adsorbed by an EPDM raw material and molded EPDM product. If such EPDM product is used as a part of a disk apparatus, the siloxane-based gas is released as an outgas component into the apparatus. The released siloxane-based gas deposits in undesired portions in the apparatus, e.g., a portion between a read/write element of a head and the surface of a disk medium and in a portion surrounding that portion. The deposited gas slides with the head and causes a defect, e.g., varies the floating posture of the head, thereby lowering the reliability of the disk apparatus.

Furthermore, hydrocarbon-based oil for hardness adjustment is added to a gasket using a hydrocarbon-based elastic material such as EPDM. This oil is extracted by a cleaning agent or organic solvent used in gasket cleaning or disk apparatus cleaning, and readily remains as a residue around the gasket. This residue may transfer to and contaminate the assembly environment, jig, and peripheral apparatus of the magnetic disk apparatus, thereby causing functional defects of various parts.

To prevent this, Jpn. Pat. Appln. KOKAI Publication No. 2000-344987, for example, proposes the use of a mixture of fluorine rubber and non-fluorine rubber, e.g., silicone rubber and acrylic rubber, as a gasket. However, this mixture contains a large amount of a siloxane-based organic gas component as an impurity, and the acrylic rubber is susceptible to adsorption contamination by siloxane from the environment. Therefore, the generation of outgas and the extraction of oil cannot be well prevented.

BRIEF SUMMARY OF THE INVENTION

An embodiment of the present invention may provide a gasket which can be inexpensively molded into a complicated shape light in weight, which does not cause adsorption by a siloxane-based gas, and which does not produce any residue of hydrocarbon-based oil.

It is the second embodiment of the present invention may provide a highly reliable disk apparatus by using a gasket which can be inexpensively molded into a complicated shape light in weight, which does not cause adsorption by a siloxane-based gas, and which does not produce any residue of hydrocarbon-based oil.

First, according to the embodiment of the present invention, it provides a gasket for a disk apparatus, comprising a molded product containing a hydrocarbon-based organic elastic material and a fluorine-based resin having a vapor pressure of $1.3 \times 10^{-8}$ Pa to 1.3 kPa at 100° C.

Second, according to the embodiment of the present invention, it provides a cover for a disk apparatus comprising, a gasket for a disk apparatus including a molded product using a composition containing a hydrocarbon-based organic elastic material and a fluorine-based resin having a vapor pressure of $1.3 \times 10^{-8}$ Pa to 1.3 kPa at 100° C.

Third, according to the embodiment of the present invention, it provides a disk apparatus case comprising a gasket for a disk apparatus including a molded product using a composition containing a hydrocarbon-based organic elastic material and a fluorine-based resin having a vapor pressure of $1.3 \times 10^{-8}$ Pa to 1.3 kPa at 100° C.

Fourth, according to the embodiment of the present invention, it provides a disk apparatus comprising a case, a gasket including a molded product containing a hydrocarbon-based organic elastic material and a fluorine-based resin having a vapor pressure of $1.3 \times 10^{-8}$ Pa to 1.3 kPa at 100° C., and a cover.

Fifth, according to the embodiment of the present invention, it provides a disk apparatus comprising a case, a disk medium housed in the case, a driving mechanism which supports and rotates the disk medium, a head having an element for reading information from the disk medium, and a carriage assembly which supports the head to be movable relative to the disk medium, a cover which covers the case, and a gasket formed between the case and cover, and including a molded product containing a hydrocarbon-based organic elastic material and a fluorine-based resin having a vapor pressure of $1.3 \times 10^{-8}$ Pa to 1.3 kPa at 100° C.

Additional embodiment and advantages of the invention will be set forth in the description which follows, and in part will be obvious from the description, or may be learned by practice of the invention. The embodiment and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the generation description given above and the detailed description of the preferred embodiments given below, serve to explain the principles of the invention.

DETAILED DESCRIPTION OF THE INVENTION

A gasket for a disk apparatus according to the present invention includes a molded product formed using a composition containing a hydrocarbon-based organic elastic material and a fluorine-based resin having a vapor pressure of $1.3 \times 10^{-8}$ Pa to 1.3 kPa at 100° C.

In this gasket of the present invention, the molded product can be used singly or can be formed on at least one surface of a rigid frame such as a metal frame.

Figure 1:
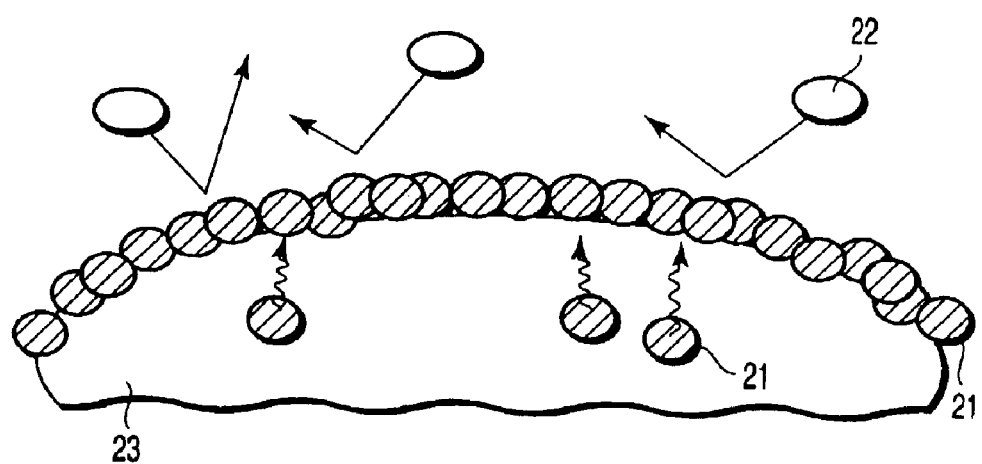
FIG. 1 is a schematic view showing the way a fluorine-based resin component segregates to the surface of a hydrocarbon-based organic elastic material.

In the present invention, when molding is performed using the above composition, the fluorine-based resin component having low surface energy segregates on the surface of the hydrocarbon-based organic elastic material in the obtained molded product. FIG. 1 is a schematic view showing this phenomenon.

As shown in FIG. 1, a fluorine-based resin component 21 oozes out to the surface of a hydrocarbon-based organic elastic material 23 and covers this surface. This reduces adsorption contamination of the gasket caused by a siloxane-based gas component 22, and improves the weather resistance of the gasket against a cleaning agent and solvent used in rubber washing and cleaning.

In particular, a slight amount of adsorption contamination by a siloxane-based gas component from the storage environment can be also prevented after molding and before assembly. Therefore, a siloxane component sealed in the disk apparatus can be finely and stably controlled.

As described above, the present invention can provide a gasket for a disk apparatus which can be inexpensively molded into a complicated shape light in weight, without causing adsorption by a siloxane-based gas and producing any residue of hydrocarbon-based oil.

A cover for a disk apparatus according to the present invention has a cover body, and the gasket described above formed on the rear surface of the cover body.

A disk apparatus case of the present invention has a cover body, and the gasket described above formed on the surface of an outer frame of the case, i.e., on the surface in contact with a cover.

A disk apparatus of the present invention has a disk apparatus case, a disk apparatus cover, and a gasket for a disk apparatus interposed between them.

Furthermore, a preferred disk apparatus of the present invention comprises a case, a disk medium housed in the case, a driving mechanism which supports and rotates the disk medium, a head having an element for reading information from the disk medium, and a carriage assembly which supports the head to be movable relative to the disk medium, a cover which covers the case, and the gasket described above formed between the case and cover.

Examples of the hydrocarbon-based organic elastic material used in the present invention are an ethylenepropylenediene terpolymer (EPDM), a mixture of the ethylenepropylenediene terpolymer (EPDM) and butyl rubber, and an ethylenepropylene copolymer (EPM).

The fluorine-based resin used in the present invention has a vapor pressure of $1.3 \times 10^{-8}$ Pa to 1.3 kPa at 100° C. If this vapor pressure at 100° C. is less than $1.3 \times 10^{-8}$ Pa, the fluorine resin cannot well form a protective film on the surface of the elastic material. This makes it impossible to obtain a satisfactory adsorption preventing effect, high cleaning resistance, or high chemical resistance. If the vapor pressure at 100° C. exceeds 1.3 kPa, vigorous evaporation makes manufacture and processing difficult, and the fluorine resin is not easily held in the elastic material any longer. Accordingly, the aforementioned effect or resistance cannot be maintained for long time periods.

The addition amount of the fluorine-based resin is preferably 0.005 to 1 part by weight with respect to 100 parts by weight of the hydrocarbon-based organic elastic material. If this addition amount of the fluorine-based resin is less than 0.005 parts by weight, it is often impossible to continuously ensure a satisfactory adsorption preventing effect, high cleaning resistance, or high chemical resistance. If the addition amount of the fluorine-based resin exceeds 1 part by weight, the moldability often lowers under the influence of, e.g., segregation of the fluorine-based resin. The addition amount of the fluorine-based resin is more preferably 0.005 to 0.5 parts by weight.

The fluorine-based resin used in the present invention preferably has a functional group, e.g., a hydroxyl group, amino group, carboxyl group, or mercapto group, rather than a nonfunctional group, since the dispersibility improves. When the fluorine-based resin material homogeneously disperses in fine units in the hydrocarbon-based organic elastic material, it is possible to suppress adsorption by the siloxane-based gas component and obtain a molded product having high weather resistance, without deteriorating the original elasticity, mechanical strength, and heat resistance of the hydrocarbon-based organic elastic material.

Examples of the fluorine-based resin used in the present invention are hydroxyl group-containing polyfluoroalkyl (HO—FC), hydroxyl group-containing polyfluoroether (HO—FCO), nonfunctional group polyfluoroether (FCO), nonfunctional group polyfluoroalkyl (FC), carboxyl group-containing polyfluoroether (HOOC—FCO), mercapto group-containing polyfluoroalkyl (HS—FC), epoxy group-containing polyfluoroalkyl (EPOX—FC), and $CnF_{2n+1}$—$(CH_2OCH_2CHCH_2O)$ The molded product used in the gasket for the disk apparatus according to the present invention can further contain hydrocarbon-based oil. Examples of this oil are paraffin-based oil, naphthene-based oil, and aromatic group-based oil.

This molded product can also contain additives such as an antioxidant (e.g., BHT), reinforcing agent, filler (e.g., $CaCO_3$ or magnesium oxide), crosslinking accelerator (e.g., stearic acid), defoamer (e.g., calcium oxide), and vulcanizing accelerator (triacylcyanurate).

The present invention will be described in detail below with reference to the accompanying drawing.

Figure 2:
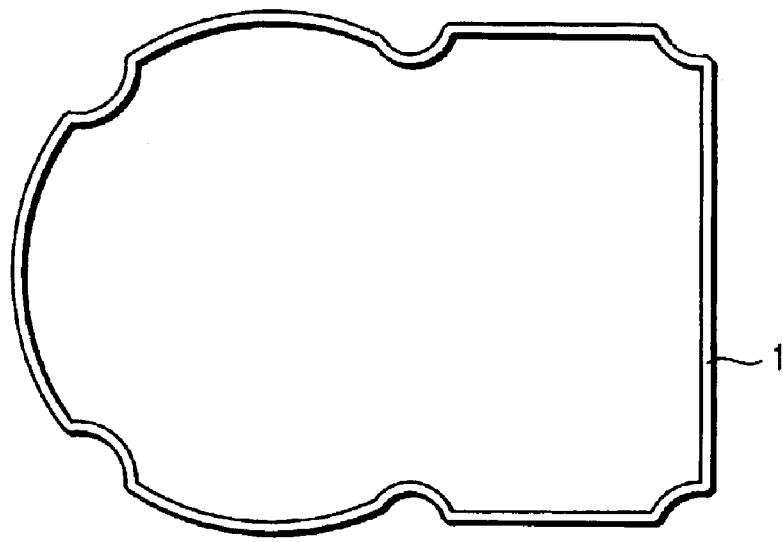
FIG. 2 is a front view showing an example of a gasket for a disk apparatus according to one embodiment of the present invention.
Figure 3:
FIG. 3 is a longitudinal sectional view of FIG. 2.

FIG. 2 is a front view showing an example of a gasket for a disk apparatus according to the present invention. FIG. 3 is a longitudinal sectional view of FIG. 2.

As shown in FIGS. 2 and 3, this gasket 1 is a molded product having a frame shape molded by using a composition containing a hydrocarbon-based organic elastic material and a fluorine-based resin having a vapor pressure of $1.3 \times 10^{-8}$ Pa to 1.3 kPa at 100° C., in accordance with the shape of the outer frame surface of a case and the shape of a cover to which this gasket 1 is applied.

Figure 4:
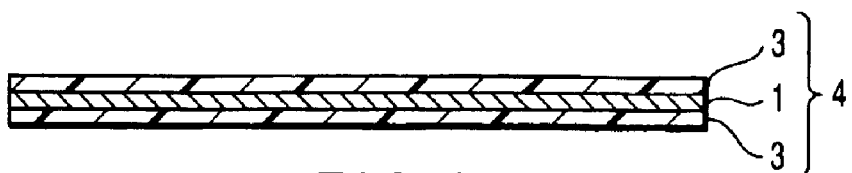
FIG. 4 is a longitudinal sectional view showing another example of the gasket for a disk apparatus according to one embodiment of the present invention.

FIG. 4 is a longitudinal sectional view showing another example of the gasket for the disk apparatus according to the present invention.

The frame shape of this gasket 4 viewed frontways is the same as FIG. 2. However, as shown in FIG. 4, this gasket 4 has a rigid frame 2 and molded products 3 formed on both the surfaces of the rigid frame 2. The rigid frame 2 is made of a metal such as stainless steel and has a frame shape similar to that of the gasket 4. The molded product 3 is molded using a composition containing a hydrocarbon-based organic elastic material and a fluorine-based resin having a vapor pressure of $1.3 \times 10^{-8}$ Pa to 1.3 kPa at 100° C.

Figure 5:
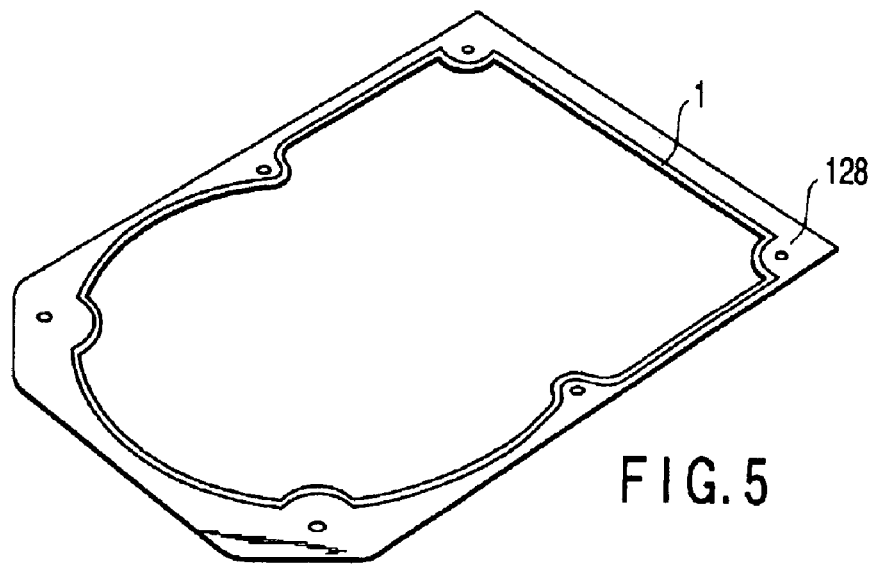
FIG. 5 is a view showing the rear surface of an example of a cover according to one embodiment of the present invention.

FIG. 5 is a view showing the rear surface of an example of a cover according to the present invention.

As shown in FIG. 5, this cover 128 has a cover body, and a frame-shaped gasket 1 formed on the rear surface of this cover body. The gasket 1 is molded in accordance with the shape of this cover and the surface shape of an outer frame of a case to which this cover is applicable.

Figure 6:
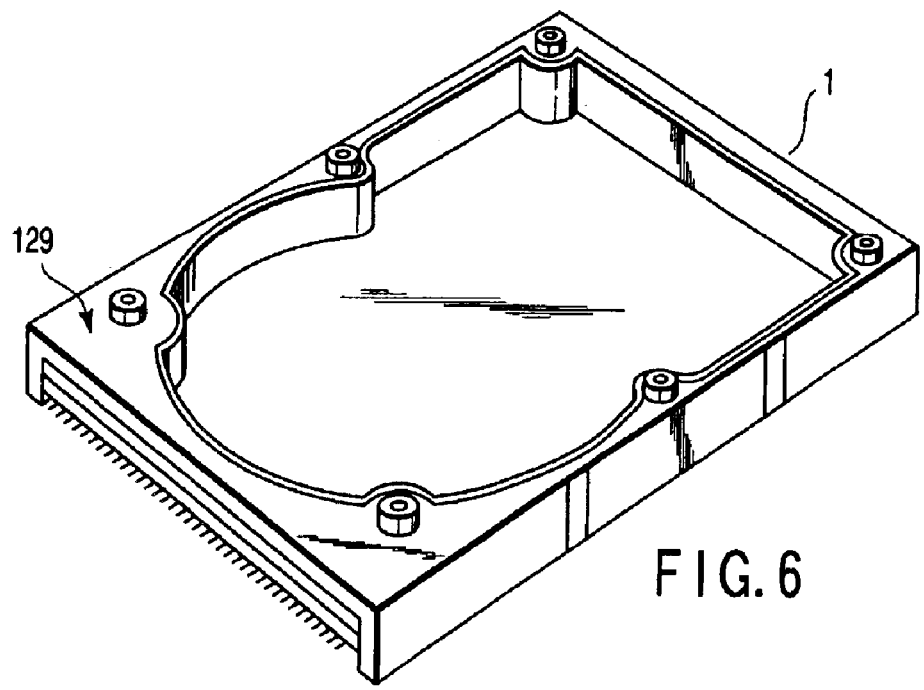
FIG. 6 is a view showing a case according to one embodiment of the present invention.

FIG. 6 is a view showing a case according to the present invention. As shown in FIG. 6, this case 129 has a case body, and a frame-shaped gasket 1 molded on the surface of an outer frame of the case body in accordance with the surface shape.

Figure 7:
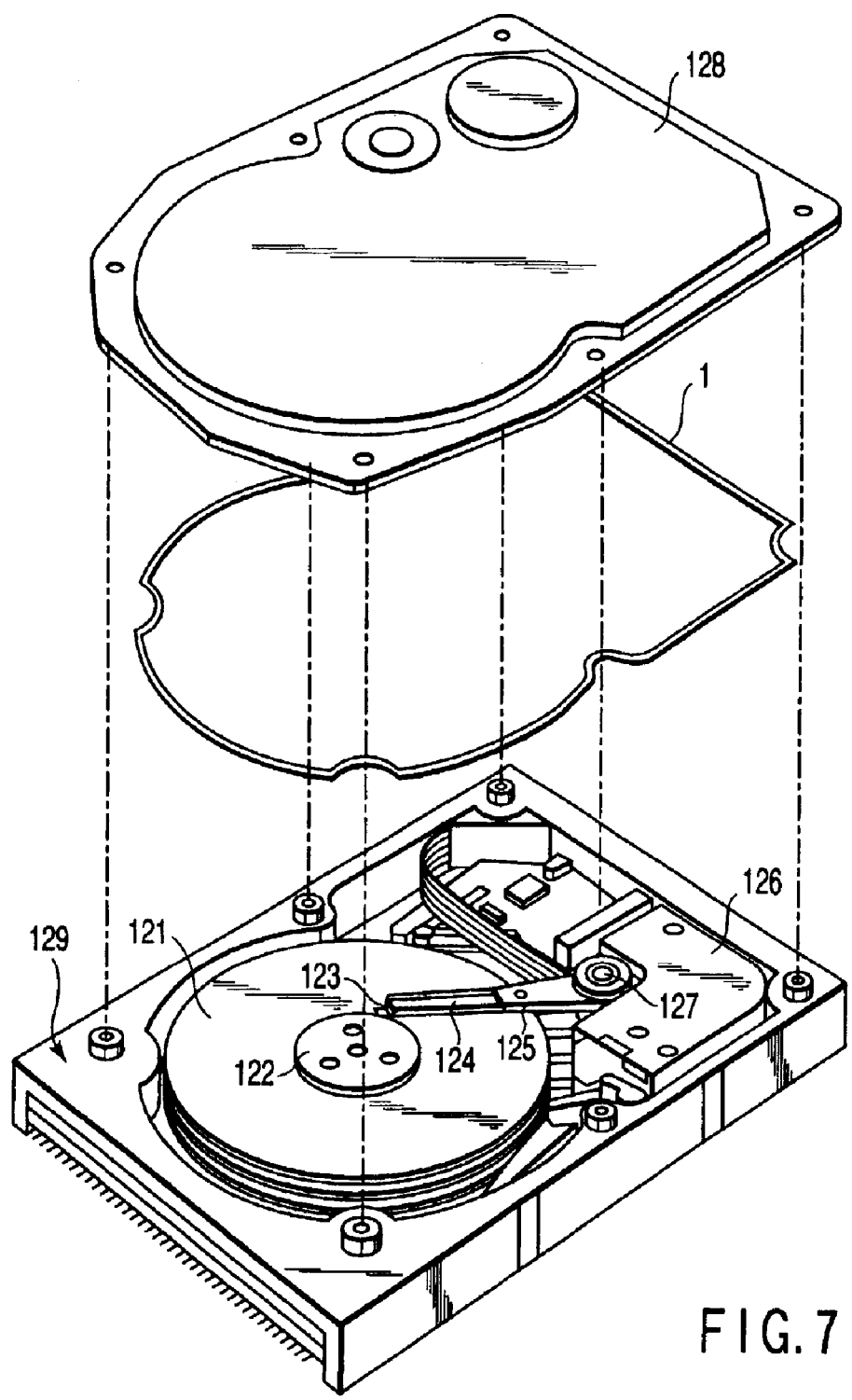
FIG. 7 is a partially exploded perspective view showing an example of a disk apparatus according to one embodiment of the present invention.

FIG. 7 is a partially exploded perspective view showing an example of a disk apparatus according to the present invention.

This disk apparatus of the present invention comprises a disk apparatus case 129, a cover 128 for covering the case 129, and a frame-shaped gasket 1 sandwiched between them. This gasket 1 is molded in accordance with the surface shape of an outer frame of the case 129 to which the cover 128 is applicable. The following members are housed in the case 129.

A rigid disk 121 which has an arrangement shown in FIG. 7 and which records information is provided on a spindle 122 and rotated at a predetermined rotational speed by a spindle motor (not shown). A slider 123 mounting a head which reproduces information by accessing the disk 121 is attached to the end portion of a suspension 124 which is a thin leaf spring. This suspension 124 is connected to one end of an arm 125 having, e.g., a bobbin for holding a driving coil (not shown).

The other end of the arm 125 has a voice coil motor 126 as a kind of a linear motor. This voice coil motor 126 includes the driving coil (not shown) wound about the bobbin of the arm 125, and a magnetic circuit made up of a permanent magnet and counter yoke arranged to have the driving coil interposed therebetween.

The arm 125 is held by ball bearings (not shown) formed in two, upper and lower portions of a stationary shaft 127, and swung by the voice coil motor 126. That is, the position of the slider 123 on the disk 121 is controlled by the voice coil motor 126.

The present invention will be described in more detail below by way of its examples.

EXAMPLES 1–6

100 parts by weight of ethylenepropylene rubber (EPR), 50 parts by weight of calcium carbonate, 10 parts by weight of process oil, 3 parts by weight of an organic peroxide crosslinking agent (dicumyl peroxide), and 3 parts by weight of an additive (calcium oxide) were mixed using a kneader stock blender open roll, thereby obtaining an uncrosslinked mixture. The obtained mixture was placed in a pelleter, and pellets 5 mm in diameter and about 5 mm in length were formed as material pellets by the pelleter.

0.005, 0.01, 0.05, 0.1, 0.5, and 1 part by weight of hydroxyl group-containing polyfluoroalkyl $C_8F_{17}C_2H_4OH$ (vapor pressure at 100° C. was 25 Pa) were added to the total weight of the obtained material pellets, and the resultant materials were kneaded. Each kneaded material was placed in the pelleter again to form pellets 3 mm in diameter and 2 mm in length. Note that the material pellets were used for comparison.

Examples of the kneading method are an open roll, Banbury mixer, and kneader. As in the above example, a fluorine-based resin is desirably supplied after process oil.

These pellets were placed in and molded by a molding machine for a top cover-integrated cover seal for a 2.5-inch disk drive, thereby obtaining top covers with cover seals. Each top cover with a cover seal was baked for degassing at 120° C. for 4 hrs.

Each resultant cover seal was partially disassembled, and the cover seal surface was observed with an X-ray photoelectron spectrochemical analyzer using the aluminum Kα line, thereby measuring the peak ratio of CF bond/CC bond of the CLs peak. In this way, whether a fluorine-based organic material segregated on the cover seal surface was checked. The obtained result is shown in Table 1 below.

In addition, each cover seal was pulverized into particles about 30 μm by using a freeze pulverizer, and extraction was performed using $C_4F_9OCH_3$ (Sumitomo 3M: Novec HFE-7100) as a fluorine-based organic solvent. A residue obtained by evaporating the extracted solution was analyzed by using liquid chromatography. The result is shown in Table 1.

Also, a 120° C.×4 hrs dynamic head space sampling method was used to perform heat desorption of a siloxane-based outgas, and measurement was performed using a GC/MS analyzer. The result is shown in Table 1.

Siloxane-based gas exposure test

Each obtained cover seal was exposed to a high-concentration siloxane environment containing about 0.5 ng/L of cyclic siloxane tetramer (cyclotetrasiloxane, octamethyl group) at room temperature for 10 days. After that, the cover seal was taken out and subjected to heat adsorption by using a 120° C.×4 hrs dynamic head space analyzing method (IDEMA STANDARDS No. 11–99). The cyclic siloxane tetramer (cyclotetrasiloxane, octamethyl group) contained in the seal rubber was measured using the GC/MS analyzer. The result is shown in Table 1.

Note that the material pellets were used for comparison.

Test of weather resistance against organic solvent

About 1 ml of hexane was evenly dropped onto seal rubber about 1 cm long of the cover seal. The cover seal was naturally dried as it was left to stand for 1 hr. The cover seal was then dried on a hot plate at 100° C. for 30 min, and the residue was checked.

In the comparative example, a liquid residue about 5 mm wide was observed on the top cover surface near the cover seal. The obtained residue was analyzed with a microscopic infrared spectrochemical analyzer (FT-IR). As a result, a

TABLE 1

| | Fluorine-based resin addition amount | CF/CC bond peak ratio | Result of analysis of fluorine-based resin content | Result of analysis of initial siloxane-based gas component | Result of measurement of siloxane-based outgas after exposure test |
|---|---|---|---|---|---|
| Comparative example | 0 | 0 | Not detected | 0.4 ng | 7.5 ng |
| Examples 1 | 0.006 | 3.6 | 0.005 wt % | 0.3 ng | 0.9 ng |
| 2 | 0.01 | 3.8 | 0.009 wt % | 0.2 ng | 0.4 ng |
| 3 | 0.05 | 3.9 | 0.047 wt % | 0.2 ng | 0.3 ng |
| 4 | 0.1 | 3.9 | 0.099 wt % | 0.3 ng | 0.4 ng |
| 5 | 0.5 | 3.9 | 0.48 wt % | 0.2 ng | 0.3 ng |
| 6 | 1 | 3.9 | 0.95 wt % | 0.2 ng | 0.3 ng |

As is apparent from Table 1, most of the added fluorine-based resin segregated on the cover seal surface.

Also, the siloxane-based gas content in the cover seal in the initial stages of molding was as slight as 0.5 ng or less.

Furthermore, in the comparative example, 7.5 ng of the siloxane-based gas were detected after the exposure test. This amount was larger than that in the initial stages of molding. By contrast, in the cover seals of Examples 1 to 6, the detected amounts were as slight as 1 ng or less, although very small increases were found.

EXAMPLE 7

100 parts by weight of EPR, 30 parts by weight of calcium carbonate, 5 parts by weight of process oil, 5 parts by weight of an organic peroxide crosslinking agent (dicumyl peroxide), 2 parts by weight of an additive (stearic acid), and 3 parts by weight of an antioxidant (butyrated hydroxytoluene (BHT)) were mixed using a kneader and open roll. The resultant uncrosslinked mixture was placed in a pelleter to form pellets 3 mm in diameter and about 5 mm in length as material pellets.

0.005 parts by weight of hydroxyl group-containing polyfluoroether (Fonblin Z DOL-2000 (vapor pressure at 100° C. was 0.26 Pa) manufactured by Ausimont K. K.) were added to the total weight of the obtained material pellets, thereby obtaining a molded raw material of Example 7.

Also, 0.005 parts by weight of carboxyl group-containing polyfluoroether (Fonblin Z DIACID-2000 (vapor pressure at 100° C. was 0.26 Pa) manufactured by Ausimont K.K.) were added to the total weight of the obtained material pellets, thereby obtaining a molded raw material of Example 8.

After these materials were kneaded, pellets 2 mm in diameter and about 2 mm in length were formed using the pelleter again.

These pellets were placed in and molded by a molding machine for a top cover-integrated cover seal for a 2.5-inch disk drive, thereby obtaining top covers with cover seals. Each top cover with a cover seal was baked for degassing at 120° C. for 4 hrs.

spectrum equivalent to that of process oil was obtained from the deposit, indicating that the deposit was oozing of the process oil. On the other hand, no residue was observed on the cover seals of Examples 7 and 8.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A gasket for a disk apparatus comprising a molded product not containing a siloxane component and containing a hydrocarbon-based organic elastic material and a fluorine-based resin having a vapor pressure of $1.3 \times 10^{-8}$ Pa to 1.3 kPa at 100° C., wherein the fluorine-based resin segregates on the surface of the hydrocarbon-based organic elastic material, and is at least one material selected from the group consisting of hydroxyl group-containing polyfluoroalkyl (HO—FC), hydroxyl group-containing polyfluoroether (HO—FCO), nonfunctional group polyfluoroether (FCO), nonfunctional group polyfluoroalkyl (FC), carboxyl group-containing polyfluoroether (HOOC—FCO), mercapto group-containing polyfluoroalkyl (HS—FC), epoxy group-containing polyfluoroalkyl (EPOX—FC), and $C_nF_{2n+1}$—(CH$_2$OCH$_2$CHCH$_2$O).

2. A gasket according to claim 1, further comprising a rigid frame, wherein the molded product is formed on the rigid frame.

3. A gasket according to claim 1, wherein the hydrocarbon-based organic elastic material is at least one material selected from the group consisting of an ethylenepropylenediene terpolymer (EPDM), a mixture of the ethylenepropylenediene terpolymer (EPDM) and butyl rubber, and an ethylenepropylene copolymer (EPM).

4. A cover for a disk apparatus comprising a gasket including a molded product using a composition not containing a siloxane component and containing a hydrocarbon-based organic elastic material and a fluorine-based resin having a vapor pressure of $1.3 \times 10^{-8}$ Pa to 1.3 kPa at 100° C., wherein the fluorine-based resin segregates on the surface of the hydrocarbon-based organic elastic material, and is at least one material selected from the group consisting of hydroxyl group-containing polyfluoroalkyl (HO—FC), hydroxyl group-containing polyfluoroether (HO—FCO), nonfunctional group polyfluoroether (FCO), nonfunctional group polyfluoroalkyl (FC), carboxyl group-containing polyfluoroether (HOOC—FCO), mercapto group-containing polyfluoroalky (HS—FC), epoxy group-containing polyfluoroalkyl (EPOX—FC), and $C_nF_{2n+1}$—$(CH_2OCH_2CHCH_2O)$.

5. A cover according to claim 4, wherein the gasket for a disk apparatus further comprises a rigid frame, and the molded product is formed on the rigid frame.

6. A cover for a disk apparatus according to claim 4, wherein the hydrocarbon-based organic elastic material is at least one material selected from the group consisting of an ethylenepropylenediene terpolymer (EPDM), a mixture of the ethylenepropylenediene terpolymer (EPDM) and butyl rubber, and an ethylenepropylene copolymer (EPM).

7. A case for a disk apparatus comprising a gasket including a molded product using a composition not containing a siloxane component and containing a hydrocarbon-based organic elastic material and a fluorine-based resin having a vapor pressure of $1.3 \times 10^{-8}$ Pa to 1.3 kPa at 100° C., wherein the fluorine-based resin segregates on the surface of the hydrocarbon-based organic elastic material, and is at least one material selected from the group consisting of hydroxyl group-containing polyfluoroalkyl (HO—FC), hydroxyl group-containing polyfluoroether (HO—FCO), nonfunctional group polyfluoroether (FCO), nonfunctional group polyfluoroakly (FC), carboxyl group-containing polyfluoroether (HOOC—FCO), mercapto group-containing polyfluoroalkyl (HS—FC), epoxy group-containing polyfluoroalkyl (EPOX—FC), and $C_nF_{2n+1}$—$(CH_2OCH_2CHCH_2O)$.

8. A case according to claim 7, wherein the gasket further comprises a rigid frame, and the molded product is formed on the rigid frame.

9. A case according to claim 7, further comprising a disk medium, and a head having an element for reading information from the disk medium.

10. A case for a disk apparatus according to claim 7, wherein the hydrocarbon-based organic elastic material is at least one material selected from the group consisting of an ethylenepropylenediene terpolymer (EPDM), a mixture of the ethylenepropylenediene terpolymer (EPDM) and butyl rubber, and an ethylenepropylene copolymer (EPM).

11. A disk apparatus comprising a case, a gasket including a molded product not containing a siloxane component and containing a hydrocarbon-based organic elastic material and a fluorine-based resin having a vapor pressure of $1.3 \times 10^{-8}$ Pa to 1.3 kPa at 100° C., and a cover, wherein the fluorine-based resin segregates on the surface of the hydrocarbon-based organic elastic material, and is at least one material selected from the group consisting of hydroxyl group-containing polyfluoroalkyl (HO—FC), hydroxyl group-containing polyfluoroether (HO—FCO), nonfunctional group polyfluoroether (FCO), nonfunctional group polyfluoroalkyl (FC), carboxyl group-containing polyfluoroether (HOOC—FCO), mercapto group-containing polyfluoroalkyl (HS—FC), epoxy group-containing polyfluoroakyl (EPOX—FC), and $C_nF_{2n+1}$—$(CH_2OCH_2CHCH_2O)$.

12. An apparatus according to claim 8, wherein the gasket for a disk apparatus further comprises a rigid frame, and the molded product is formed on the rigid frame.

13. A disk apparatus according to claim 11, wherein the hydrocarbon-based organic elastic material is at least one material selected from the group consisting of an ethylenepropylenediene terpolymer (EPDM), a mixture of the ethylenepropylenediene terpolymer (EPDM) and butyl rubber, and an ethylenepropylene copolymer (EPM).

14. A disk apparatus comprising:
    a case;
    a disk medium housed in the case, a driving mechanism which supports and rotates the disk medium, a head having an element for reading information from the disk medium, and a carriage assembly which supports the head to be movable relative to the disk medium;
    a cover which covers the case; and
    a gasket formed between the case and cover, and including a molded product not containing a siloxane compound and containing a hydrocarbon-based organic elastic material and a fluorine-based resin having a vapor pressure of $1.3 \times 10^{-8}$ Pa to 1.3 kPa at 100° C., wherein the fluorine-based resin segregates on the surface of the hydrocarbon-based organic elastic material, and is at least one material selected from the group consisting of hydroxyl group-containing polyfluoroalkyl (HO—FC), hydroxyl group-containing polyfluoroether (HO—FCO), nonfunctional group polyfluoroether (FCO), nonfunctional group polyfluoroalkyl (FC), carboxyl group-containing polyfluoroether (HOOC—FCO), mercapto group-containing polyfluoroalkyl (HS—FC), epoxy group-containing polyfluoroalkyl (EPOX—FC), and $C_nF_{2n+1}$—$(CH_2OCH_2CHCH_2O)$.

15. A disk apparatus according to claim 14, wherein the hydrocarbon-based organic elastic material is at least one material selected from the group consisting of an ethylenepropylenediene terpolymer (EPDM), a mixture of the ethylenepropylenediene terpolymer (EPDM) and butyl rubber, and an ethylenepropylene copolymer (EPM).

* * * * *